(12) United States Patent
Sano et al.

(10) Patent No.: US 11,313,256 B2
(45) Date of Patent: Apr. 26, 2022

(54) VALVE OPENING-CLOSING TIMING CONTROL APPARATUS

(71) Applicant: AISIN CORPORATION, Kariya (JP)

(72) Inventors: Hajime Sano, Kariya (JP); Hiroki Mukaide, Chiryu (JP); Kenji Ikeda, Kariya (JP); Tomoharu Otake, Kariya (JP); Kenta Koide, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 16/928,589

(22) Filed: Jul. 14, 2020

(65) Prior Publication Data

US 2021/0017886 A1 Jan. 21, 2021

(30) Foreign Application Priority Data

Jul. 18, 2019 (JP) .............................. JP2019-133101

(51) Int. Cl.
*F01L 1/352* (2006.01)
*F01L 1/047* (2006.01)
(Continued)

(52) U.S. Cl.
CPC .............. *F01L 1/352* (2013.01); *F01L 1/047* (2013.01); *F01L 9/20* (2021.01); *F16D 3/04* (2013.01); *F01L 2820/032* (2013.01)

(58) Field of Classification Search
CPC ..... F01L 1/352; F01L 2820/032; F01L 1/344; F16D 3/04; F16H 1/32
(Continued)

(56) References Cited

U.S. PATENT DOCUMENTS

2017/0138228 A1 5/2017 Miyachi et al.
2019/0292952 A1 9/2019 Miyachi et al.

FOREIGN PATENT DOCUMENTS

JP 2016044627 A 4/2016
JP 2017115601 A * 6/2017 .............. F01L 1/352
(Continued)

OTHER PUBLICATIONS

WO-2018092390, May 2018, English Language Machine Translation.*
U.S. Appl. No. 16/928,269, filed Jul. 14, 2020, Hajime Sano.

*Primary Examiner* — Patrick Hamo
*Assistant Examiner* — Wesley G Harris
(74) *Attorney, Agent, or Firm* — Buchanan Ingersoll & Rooney PC

(57) ABSTRACT

An Oldham coupling includes an engagement arm. At least either a driving-side rotor or an input gear has an engagement portion engaged with the engagement arm and is connected to the Oldham coupling. The engagement arm has a pair of arm flat surface portions perpendicular to a rotational direction of the driving-side rotor. The engagement portion has a pair of engagement flat surface portions that the arm flat surface portions face in a sliding contact manner. Each arm flat surface portion is, within a range where the arm flat surface portion slides against a facing engagement flat surface portion, always in contact with an overlapping portion of the engagement flat surface portion with the arm flat surface portion when viewed from a direction perpendicular to a sliding direction of the Oldham coupling and in which the arm flat surface portion and the engagement flat surface portion overlap each other.

3 Claims, 9 Drawing Sheets

(51) Int. Cl.
  *F16D 3/04* (2006.01)
  *F01L 9/20* (2021.01)

(58) Field of Classification Search
  USPC ............ 123/90.17, 90.15; 464/105, 102, 104
  See application file for complete search history.

(56) References Cited

FOREIGN PATENT DOCUMENTS

| | | | | |
|---|---|---|---|---|
| JP | 2018087564 A | 6/2018 | | |
| WO | WO-2016031557 A1 * | 3/2016 | ............... | F16D 3/04 |
| WO | WO-2018092390 A1 * | 5/2018 | .............. | F01L 1/356 |

\* cited by examiner

VALVE OPENING-CLOSING TIMING CONTROL APPARATUS

CROSS REFERENCE TO RELATED APPLICATIONS

This application is based on and claims priority under 35 U.S.C. § 119 to Japanese Patent Application 2019-133101, filed on Jul. 18, 2019, the entire content of which is incorporated herein by reference.

TECHNICAL FIELD

This disclosure generally relates to a valve opening-closing timing control apparatus that sets a relative rotation phase between a driving-side rotor and a driven-side rotor, by using drive force of an electric actuator.

BACKGROUND DISCUSSION

In JP2018-87564A (Reference 1), a valve opening-closing timing control apparatus including a phase adjustment mechanism that sets a relative rotation phase between a driving-side rotor and a driven-side rotor, by using drive force of an electric actuator, is described. In the valve opening-closing timing control apparatus in Reference 1, the phase adjustment mechanism includes an output gear that is disposed on the driven-side rotor coaxially with a rotation axis of the driving-side rotor, and an input gear that rotates about an eccentric axis in an orientation parallel with the rotation axis of the driving-side rotor. The input gear has a smaller number of teeth than the output gear, is arranged coaxially with the eccentric axis, and is connected to the driving-side rotor via an Oldham coupling. The phase adjustment mechanism further includes, on an inner side of the input gear, a cylindrical eccentric member that supports the input gear in such a way as to cause the input gear to rotate about the eccentric axis. The phase adjustment mechanism configured in such a way is configured, by differentiating a rotational speed of the eccentric member driven by drive force of an electric actuator from a rotational speed of the driving-side rotor, in such a way as to cause the eccentric axis to revolve and thereby change a meshing position of the output gear and the input gear.

In the valve opening-closing timing control apparatus in Reference 1, the Oldham coupling includes a plurality of engagement arms projecting in radially outward directions with the rotation axis as the center, and, in the driving-side rotor that engages with the Oldham coupling, groove portions with which the engagement arms of the Oldham coupling engage are formed. Since, when the electric actuator and the driving-side rotor rotate at the same speed, the meshing position of an outer tooth portion of the input gear with respect to an inner tooth portion of the output gear does not change, the relative rotation phase of the driven-side rotor with respect to the driving-side rotor is maintained. On the other hand, since, when the electric actuator rotates at a speed higher than or a speed lower than the driving-side rotor, the eccentric axis revolves about the rotation axis, the meshing position of the outer tooth portion of the input gear with respect to the inner tooth portion of the output gear is displaced. The displacement of the input gear causes the engagement arms of the Oldham coupling to be displaced with respect to the driving-side rotor in a direction in which the engagement arms extend and the engagement arms of the Oldham coupling to slide in a radial direction with respect to the groove portions of the driving-side rotor. Since, as illustrated in FIG. 4 in Reference 1, corners R are formed on tip sides of the engagement arms of the Oldham coupling and a diameter of the engagement arms is slightly smaller than a diameter of the driving-side rotor, the engagement arms do not come into sliding contact with the whole of inner side surfaces of the groove portions of the driving-side rotor but a part of the inner side surfaces at a time of sliding. There is a possibility that, when the engagement arms come into sliding contact with the groove portions while being tilted with respect to the groove portions, corners at the tips of the engagement arms are caused to come into contact with the groove portions and, thus, not only does friction loss at the time of sliding increase because of rubbing between corner portions on the tip sides of the engagement arms of the Oldham coupling and the inner side surfaces of the groove portions but also either or both of the corner portions and the inner side surfaces are abraded. There is also a possibility that, in this case, reliability of the phase adjustment mechanism decreases. As described above, there is room for improvement in the configuration in which the driving-side rotor and the Oldham coupling engage with each other only at a part of a region in which the driving-side rotor and the Oldham coupling can engage with each other.

A need thus exists for a valve opening-closing timing control apparatus which is not susceptible to the drawback mentioned above.

SUMMARY

A characteristic feature of this disclosure is that a driving-side rotor rotating about an rotation axis synchronously with a crankshaft of an internal-combustion engine, a driven-side rotor being arranged on an inner side of the driving-side rotor coaxially with the rotation axis and rotating integrally with a camshaft for valve opening and closing of the internal-combustion engine, and a phase adjustment mechanism setting a relative rotation phase between the driving-side rotor and the driven-side rotor, by using drive force of an electric actuator are included. The phase adjustment mechanism includes an output gear disposed on the driven-side rotor coaxially with the rotation axis, an input gear rotating about an eccentric axis having an orientation parallel with the rotation axis, having the number of teeth less than the output gear, being arranged coaxially with the eccentric axis, and being connected to the driving-side rotor via an Oldham coupling, and a cylindrically shaped eccentric member supporting, on an inner side of the input gear, the input gear in such a way as to cause the input gear to rotate about the eccentric axis, and is configured in such a way as to cause the eccentric axis to revolve by means of rotation of the eccentric member driven by drive force of the electric actuator and change a meshing position of the output gear and the input gear. The Oldham coupling includes an engagement arm projecting in a radially outward direction with the rotation axis as a center. At least either of the driving-side rotor and the input gear has an engagement portion with which the engagement arm is engaged, and is connected to the Oldham coupling. The engagement arm has a pair of arm flat surface portions perpendicular to a rotational direction of the driving-side rotor. The engagement portion has a pair of engagement flat surface portions that a pair of the arm flat surface portions face in a sliding contact manner. Each of the arm flat surface portions is configured in such a way as to be, within a range in which the arm flat surface portion slides with respect to one of the engagement flat surface portions that the arm flat surface portion faces, always in contact with an overlapping portion of the engagement flat surface portion with the arm flat surface portion when the arm flat surface portion and the engagement flat surface portion are viewed from a direction that is perpendicular to a sliding direction of the Oldham coupling and in which the arm flat surface portion and the engagement flat surface portion overlap each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed herein will be explained below with reference to the attached drawings.

[Basic Configuration]

Figure 1:
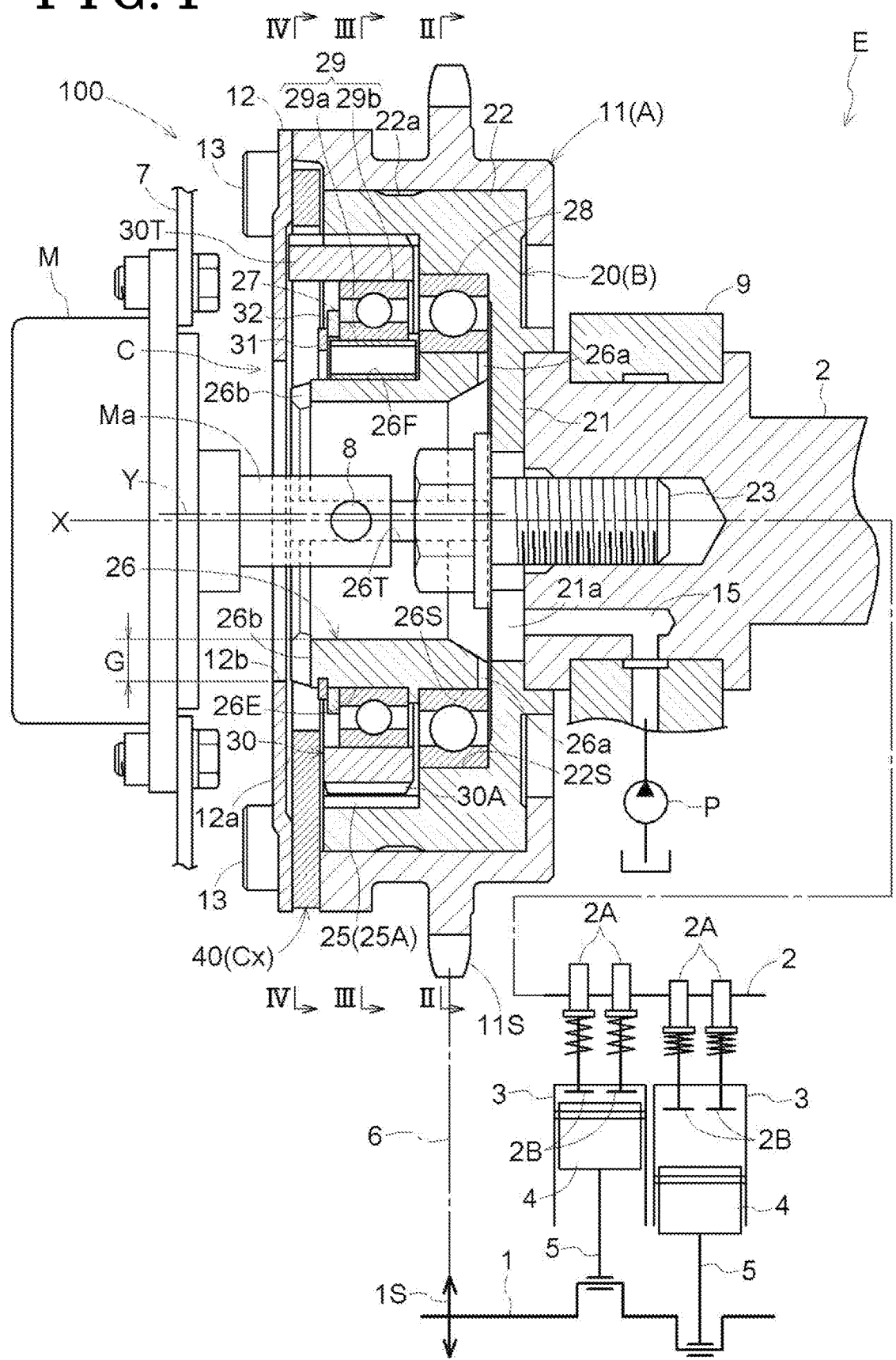
FIG. 1 is a cross-sectional view of a valve opening-closing timing control apparatus.

As illustrated in FIG. 1, a valve opening-closing timing control apparatus 100 is constituted by including a driving-side rotor A that rotates synchronously with a crankshaft 1 of an engine E serving as an internal-combustion engine, a driven-side rotor B that rotates integrally with an intake camshaft 2 about a rotation axis X, and a phase adjustment mechanism C that sets a relative rotation phase between the driving-side rotor A and the driven-side rotor B, by using drive force of a phase control motor M (an example of an electric actuator).

The engine E is configured as a four-cycle engine in which pistons 4 are housed in a plurality of cylinders 3 formed in a cylinder block and the pistons 4 are connected to the crankshaft 1 by connecting rods 5. A timing chain 6 (a timing belt or the like may work as well) is wound between an output sprocket 1S of the crankshaft 1 of the engine E and a drive sprocket 11s of the driving-side rotor A.

This configuration causes the whole of the valve opening-closing timing control apparatus 100 to rotate about the rotation axis X at the time of operation of the engine E. Making the phase adjustment mechanism C operate by using drive force of the phase control motor M enables the driven-side rotor B to be displaced with respect to the driving-side rotor A in the same direction as or the opposite direction to the rotational direction. The relative rotation phase between the driving-side rotor A and the driven-side rotor B is set by displacement in the phase adjustment mechanism C, and control of opening and closing time (opening and closing timings) of intake valves 2B by cam portions 2A of the intake camshaft 2 is thereby achieved.

Operation in which the driven-side rotor B is displaced in the same direction as the rotational direction of the driving-side rotor A is referred to as advance angle operation, which increases an intake compression ratio. Operation in which the driven-side rotor B is displaced in the opposite direction to the rotational direction of the driving-side rotor A (operation in the opposite direction to the above-described direction) is referred to as retard angle operation, which decreases the intake compression ratio.

[Valve Opening-Closing Timing Control Apparatus]

As illustrated in FIGS. 1 to 4, the driving-side rotor A is constituted by fastening an outer case 11, on the outer periphery of which a drive sprocket 11s is formed, and a front plate 12 to each other with a plurality of fastening bolts 13. The outer case 11 is formed into a bottomed cylindrical shape having an opening in the bottom.

An intermediate member 20 serving as the driven-side rotor B and the phase adjustment mechanism C including a gear reduction mechanism of hypotrochoid type are housed in the internal space of the outer case 11. The phase adjustment mechanism C includes an Oldham coupling Cx that makes phase change reflected on the driving-side rotor A and the driven-side rotor B.

The intermediate member 20, which constitutes the driven-side rotor B, is constituted by integrally forming a support wall portion 21 that is connected to the intake camshaft 2 in an orientation orthogonal to the rotation axis X and a cylindrical wall portion 22 that is formed into a cylindrical shape centered about the rotation axis X and projects in a direction away from the intake camshaft 2.

The intermediate member 20 is fitted into the outer case 11 in a relatively freely rotatable manner with the outer surface of the cylindrical wall portion 22 in contact with the inner surface of the outer case 11 and is fixed to an end of the intake camshaft 2 by a connection bolt 23 that is inserted into a through-hole at the center of the support wall portion 21. The intermediate member 20, while being fixed in this manner, is configured in such a way that the edge on the outer side (the farther side from the intake camshaft 2) of the cylindrical wall portion 22 is located on the inner side of the front plate 12.

Figure 5:
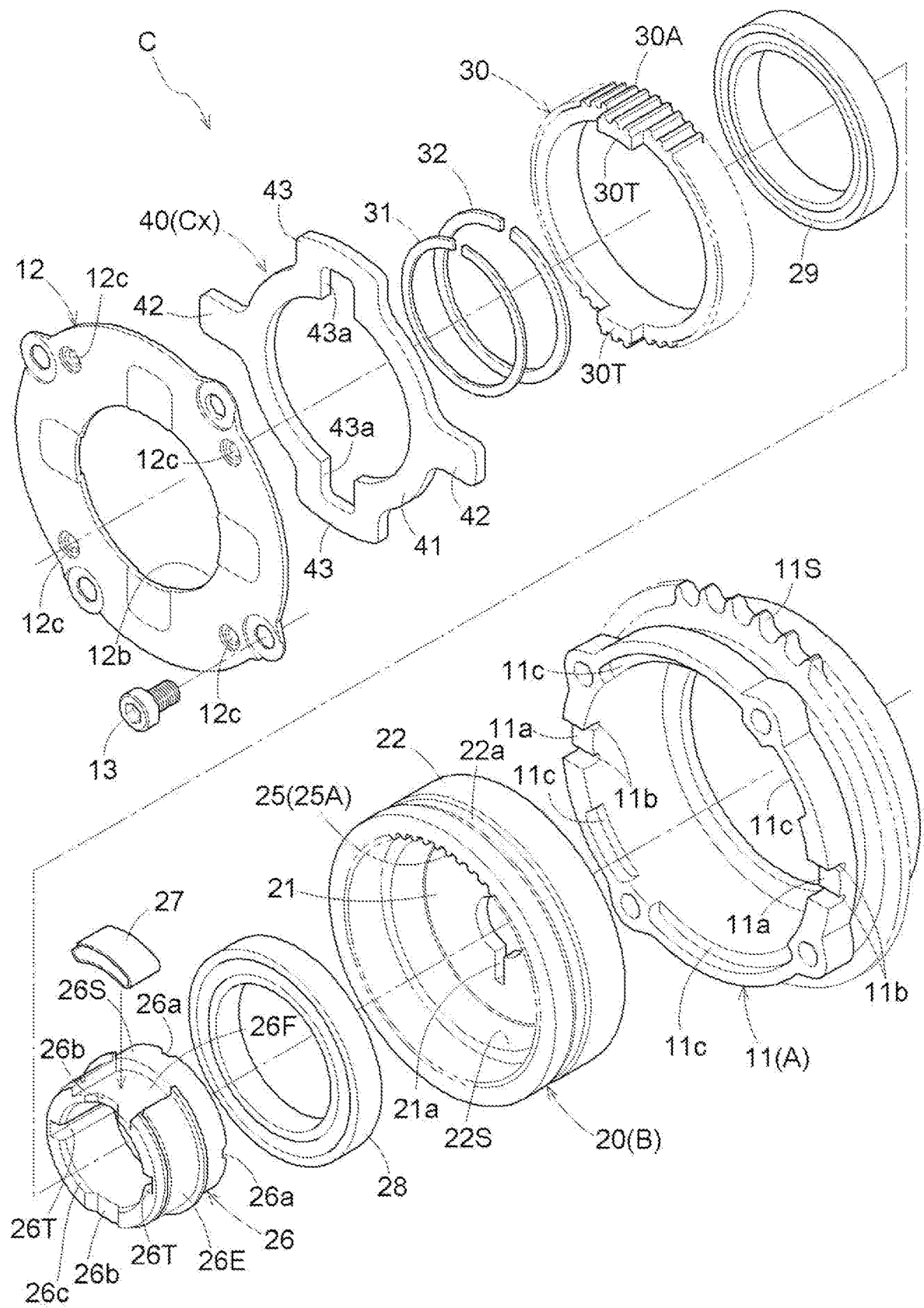
FIG. 5 is an exploded perspective view of the valve opening-closing timing control apparatus.

As illustrated in FIGS. 1 and 5, a groove portion 22a is formed on the outer periphery side of the cylindrical wall portion 22 over the entire circumference thereof. Since oil retention is improved between the outer surface of the cylindrical wall portion 22 and the inner surface of the outer case 11 by the groove portion 22a, friction force therebetween is reduced. As a result, the rotational phase of the intermediate member 20 becomes easy to be displaced on the inner side of the outer case 11.

The phase control motor M (an electric motor) is supported on the engine E by a support frame 7 in such a way as to have an output shaft Ma thereof arranged coaxially with the rotation axis X. A pair of engagement pins 8 in an orientation orthogonal to the rotation axis X are formed on the output shaft Ma of the phase control motor M.

[Phase Adjustment Mechanism]

As illustrated in FIGS. 1 to 5, the phase adjustment mechanism C is constituted by including the intermediate member 20, an output gear 25 formed on the inner peripheral surface of the cylindrical wall portion 22 of the intermediate member 20, an eccentric member 26, a spring body 27, a first bearing 28, a second bearing 29, an input gear 30, a fixing ring 31, a ring-shaped spacer 32, and the Oldham coupling Cx. Note that, although ball bearings are used for the first bearing 28 and the second bearing 29, bushes can also be used.

A support surface 22S centered about the rotation axis X and the output gear 25 centered about the rotation axis X are formed on the inner side in a direction along the rotation axis X (at a position adjacent to the support wall portion 21) and on the outer side of the support surface 22S (on the farther side from the intake camshaft 2), respectively, within the inner periphery of the cylindrical wall portion 22 of the intermediate member 20.

The eccentric member 26 has a cylindrical shape and has a circumferential support surface 26S formed on the inner side in the direction along the rotation axis X (on the closer side to the intake camshaft 2), the circumferential support surface 26S being an outer peripheral surface centered about the rotation axis X, and an eccentric support surface 26E formed on the outer side in the direction along the rotation axis X (on the farther side from the intake camshaft 2), the eccentric support surface 26E being an outer peripheral surface centered about an eccentric axis Y that is eccentric to and in an orientation parallel with the rotation axis X. The spring body 27 is fitted into a recessed portion 26F that is formed on the outer periphery of the eccentric support surface 26E.

A pair of engagement grooves 26T with one of which each of the pair of engagement pins 8 of the phase control motor M can engage are formed in an orientation parallel with the rotation axis X on the inner periphery of the eccentric member 26. Further, a plurality of first lubricating oil grooves 26a that are oriented along radial directions are formed on the inner side (on the side where the support wall portion 21 is located) of the eccentric member 26, and a plurality of second lubricating oil grooves 26b that are oriented along radial directions are formed on the outer side (on the farther side from the intake camshaft 2) of the eccentric member 26. Note that only either of the first lubricating oil grooves 26a and the second lubricating oil grooves 26b may be formed on the eccentric member 26. The numbers of the first lubricating oil grooves 26a and the second lubricating oil grooves 26b may be set at any numbers.

As illustrated in FIG. 5, tapered portions 26c the diameter of which becomes smaller toward the inner side (the closer side to the intake camshaft 2) are formed on portions on both sides of the engagement grooves 26T on the inner peripheral side of the open end on the outer side (the farther side from the intake camshaft 2) of the eccentric member 26. Since the tapered portions 26c enable the pair of engagement pins 8 of the phase control motor M to be guided to the engagement grooves 26T, it is possible to easily engage the phase control motor M and the eccentric member 26 with each other.

Figure 2:
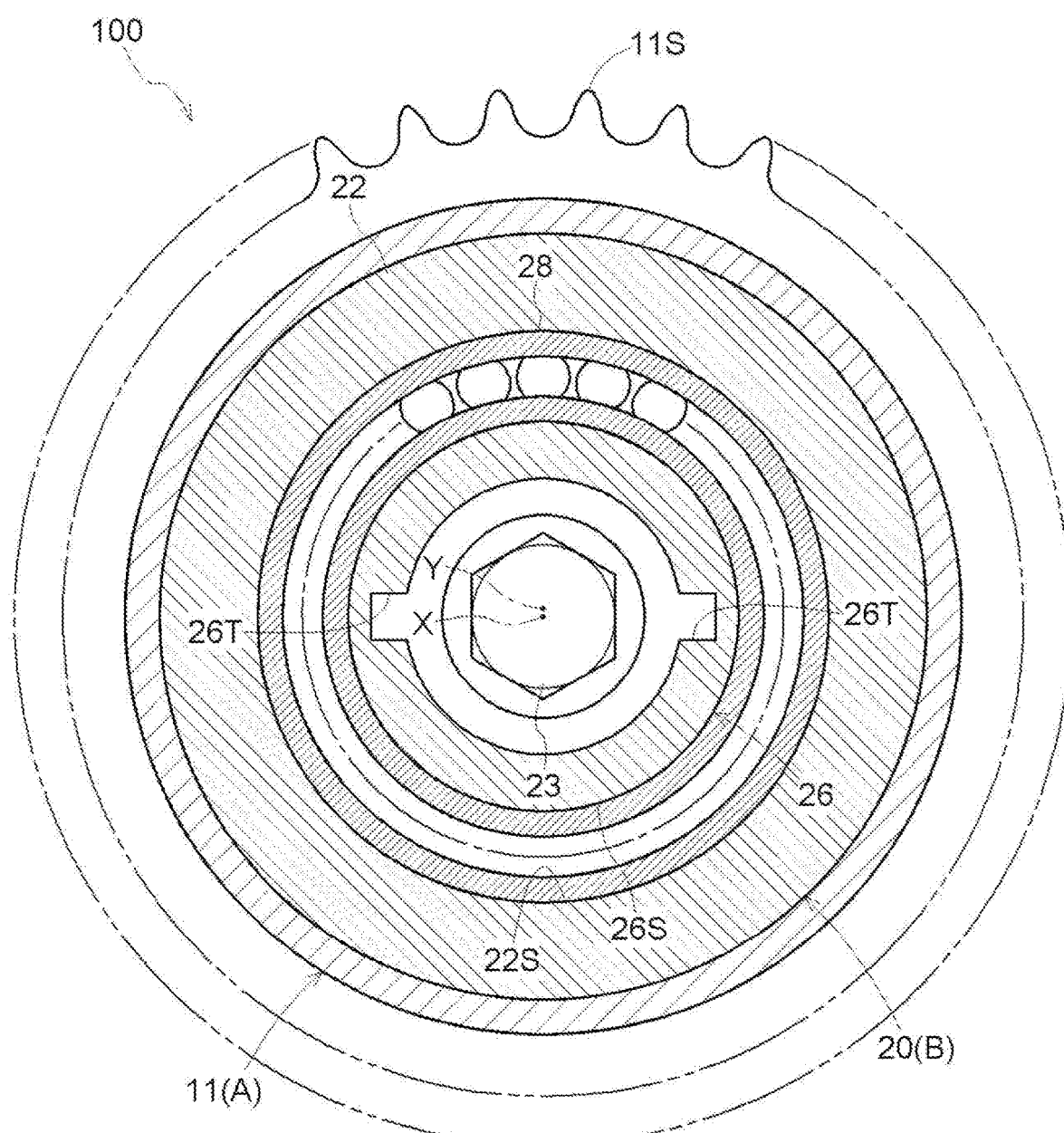
FIG. 2 is a cross-sectional view taken along the line II-II of FIG. 1.
Figure 3:
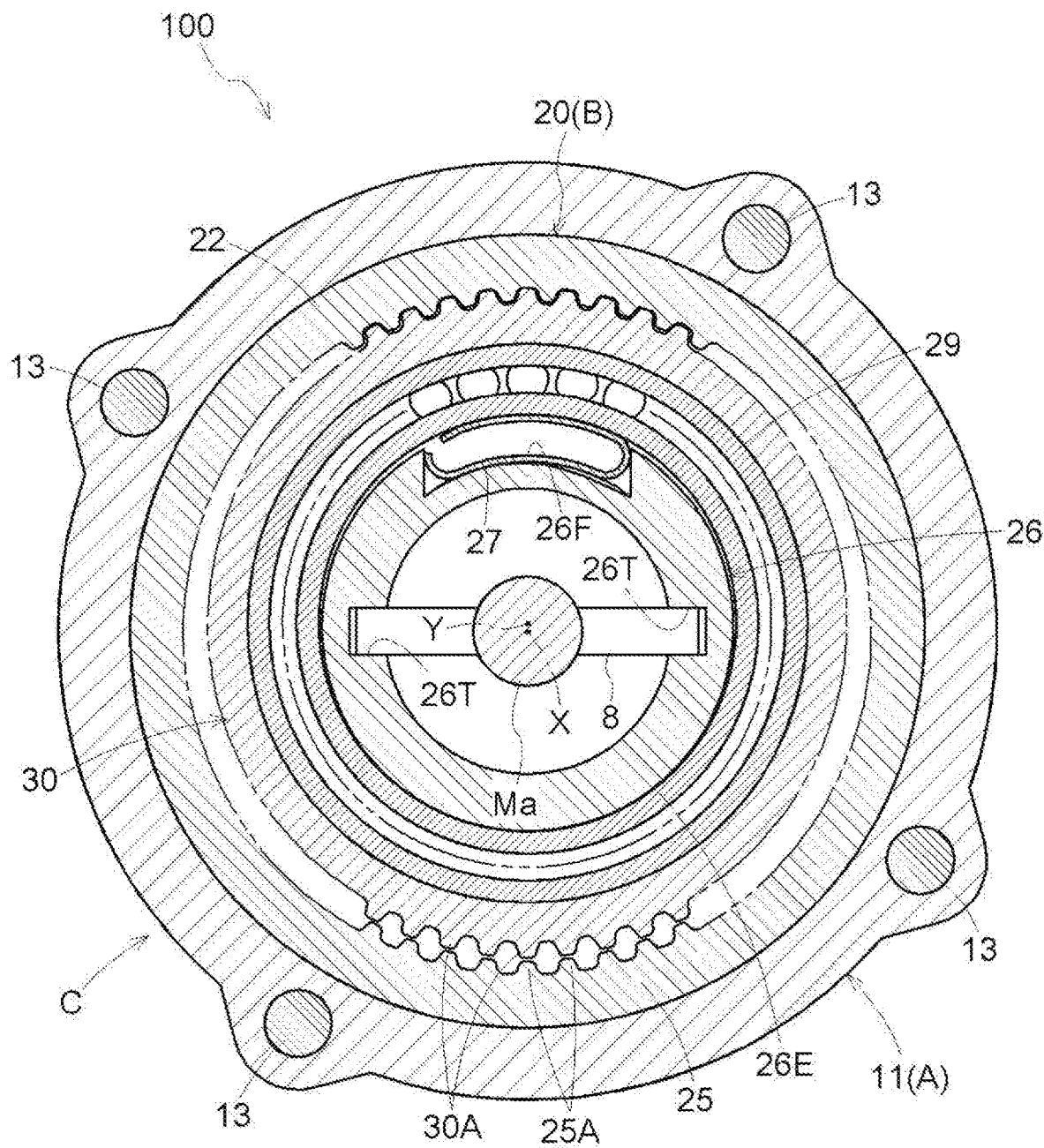
FIG. 3 is a cross-sectional view taken along the line III-III of FIG. 1.

The eccentric member 26 is supported in a freely rotatable manner about the rotation axis X with respect to the intermediate member 20 by fitting the first bearing 28 onto the circumferential support surface 26S and fitting the first bearing 28 into the support surface 22S of the cylindrical wall portion 22, as illustrated in FIGS. 1 and 2. The input gear 30 is supported in a freely rotatable manner about the eccentric axis Y via the second bearing 29 with respect to the eccentric support surface 26E of the eccentric member 26, as illustrated in FIGS. 1 and 3.

In the phase adjustment mechanism C, the number of teeth of an outer tooth portion 30A of the input gear 30 is set at a number one tooth less than the number of teeth of an inner tooth portion 25A of the output gear 25. A portion of the outer tooth portion 30A of the input gear 30 meshes with a portion of the inner tooth portion 25A of the output gear 25.

The spring body 27 has a shape formed by bending a spring plate into a letter U shape and exerts a biasing force on the input gear 30 in such a way as to cause a portion of the outer tooth portion 30A of the input gear 30 to mesh with a portion of the inner tooth portion 25A of the output gear 25. The fixing ring 31 prevents the second bearing 29 from slipping off by being supported in a fitted state onto the outer periphery of the eccentric member 26.

As illustrated in FIG. 1, the spacer 32 is arranged between the second bearing 29 and a coupling member 40 and restricts the second bearing 29 and the input gear 30 from moving to the side where the front plate 12 is located. This configuration enables engagement protrusions 30T of the input gear 30 to be prevented from coming into contact with the front plate 12.

[Phase Adjustment Mechanism: Oldham Coupling]

Figure 4:
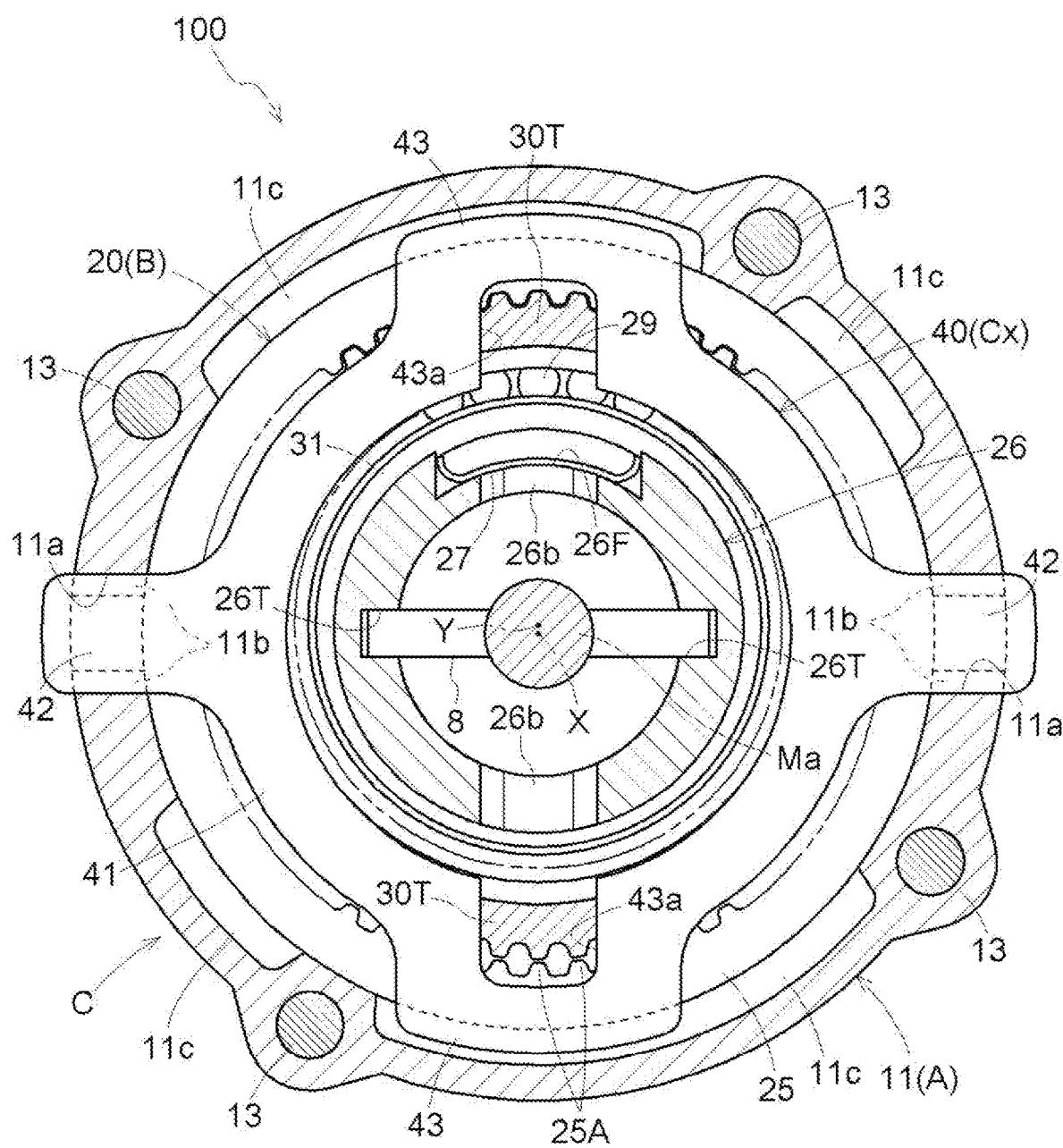
FIG. 4 is a cross-sectional view taken along the line IV-IV of FIG. 1.

As illustrated in FIGS. 1, 4, and 5, the Oldham coupling Cx is constituted by the plate-shaped coupling member 40 into which an annular portion 41 around a center opening, a pair of external engagement arms 42 (an example of a first engagement arm) projecting from the annular portion 41 toward the outer side in radial directions along first directions (the right and left directions in FIG. 4), and a pair of internal engagement arms 43 (an example of a second engagement arm) projecting from the annular portion 41 toward the outer side in radial directions along directions (the up and down directions in FIG. 4) orthogonal to the first directions are integrally formed. An engagement recessed portion 43a communicating with the opening of the annular portion 41 is formed in each of the pair of internal engagement arms 43.

A pair of guide groove portions 11a (an example of a first engagement portion) extending in radial directions with the rotation axis X as the center are formed in penetrating groove shapes penetrating from the internal space to the external space of the outer case 11 at an opening edge portion of the outer case 11 with which the front plate 12 comes into contact. The external engagement arms 42 are engaged with the guide groove portions 11a. The groove width of each of the guide groove portions 11a is set slightly wider than the width of one of the external engagement arms 42, and a pair of discharge flow passages 11b are formed in notch shapes in each of the guide groove portions 11a.

Note that the discharge flow passages 11b may be formed on the front plate 12 in such a way as to flow lubricating oil in radial directions.

As illustrated in FIG. 5, at the opening edge portion of the outer case 11, a plurality of pocket portions 11c that are formed in the circumferential direction by notching the inner periphery side of the opening edge portion are disposed on parts of the opening edge portion other than the guide groove portions 11a. In the pocket portions 11c, foreign objects that move to the outer periphery side caused by centrifugal force generated by rotation of the driving-side rotor A are collected.

On the end surface of the input gear 30 that faces the front plate 12, a pair of engagement protrusions 30T (an example of a second engagement portion) are formed integrally with the input gear 30. The engagement protrusions 30T are engaged with the engagement recessed portions 43a of the internal engagement arms 43. The length of each of the engagement protrusions 30T in a direction along the rotation axis X is set greater than the length of the engagement recessed portion 43a of one of the internal engagement arms 43 in the direction along the rotation axis X.

Because of the configuration described above, engaging the pair of external engagement arms 42 of the coupling member 40 with the pair of guide groove portion 11a of the outer case 11 and engaging the pair of engagement protrusions 30T of the input gear 30 with the engagement recessed portions 43a of the pair of internal engagement arms 43 of the coupling member 40 enable the Oldham coupling Cx to function.

Note that the coupling member 40 becomes displaceable with respect to the outer case 11 in the first directions (the right and left directions in FIG. 4) in which the relative positions of the external engagement arms 42 change and the input gear 30 becomes freely displaceable with respect to the coupling member 40 in the second directions (the up and down directions in FIG. 4) along the directions in which the engagement recessed portions 43a of the internal engagement arms 43 are formed. The first directions and the second directions are directions orthogonal to each other.

Figure 6:
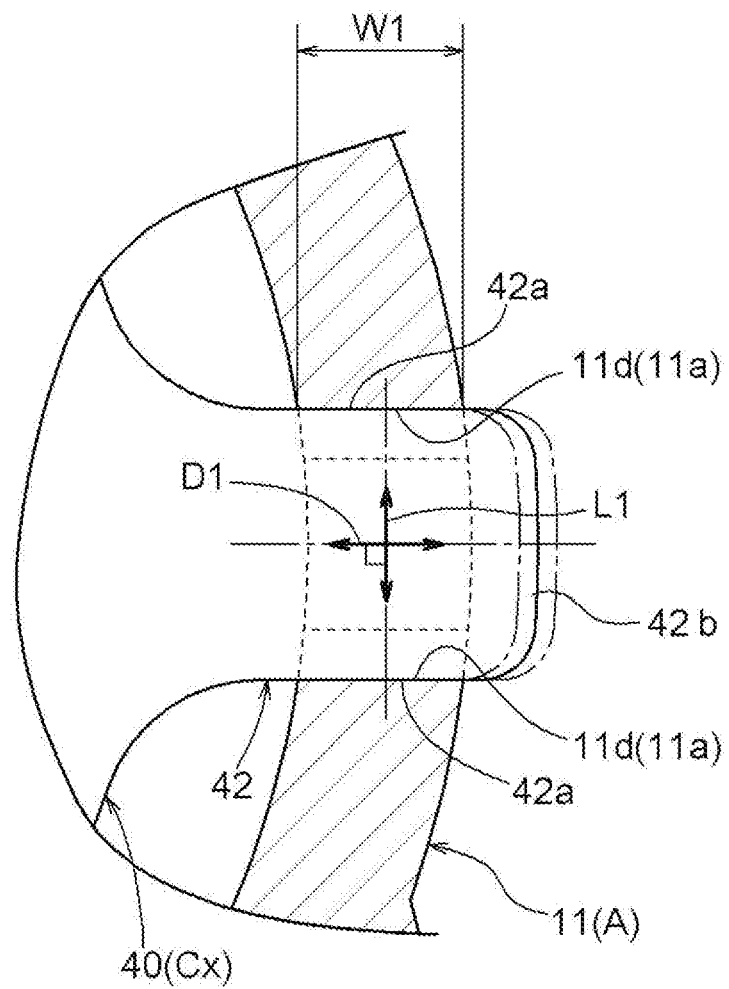
FIG. 6 is a cross-sectional view of a main part illustrating sliding operation of an external engagement arm of a coupling member.

As illustrated in FIG. 6, each of the external engagement arms 42 has both outer side surfaces 42a and 42a (an example of a pair of first arm flat surface portions) that are perpendicular to the rotational direction of the outer case 11. Each of the guide groove portions 11a of the outer case 11 has both inner side surfaces 11d and 11d (an example of a pair of first engagement flat surface portions) which the both outer side surfaces 42a and 42a of one of the external engagement arms 42 face and are in sliding contact with, respectively. In this embodiment, the length (thickness) of the coupling member 40 in a direction along the rotation axis X is set less than the length of the both inner side surfaces 11d and 11d of each of the guide groove portions 11a in the direction along the rotation axis X. That is, the length of the both outer side surfaces 42a and 42a of each of the external engagement arms 42 in the direction along the rotation axis X is less than the length of the both inner side surfaces 11d and 11d of one of the guide groove portions 11a in the direction along the rotation axis X. This configuration enables a space to be easily secured between the front plate 12 and the coupling member 40 and the coupling member 40 to also stably maintain an engagement state with the outer case 11 when the coupling member 40 slides in the direction along the rotation axis X. The length of the both outer side surfaces 42a and 42a of each of the external engagement arms 42 in the direction along the rotation axis X may be set equal to or greater than the length of the both inner side surfaces 11d and 11d of one of the guide groove portions 11a in the direction along the rotation axis X.

In such a case, however, a measure such as separately forming recessed portions at portions facing the coupling member 40 on the front plate 12 needs to be taken.

Figure 7:
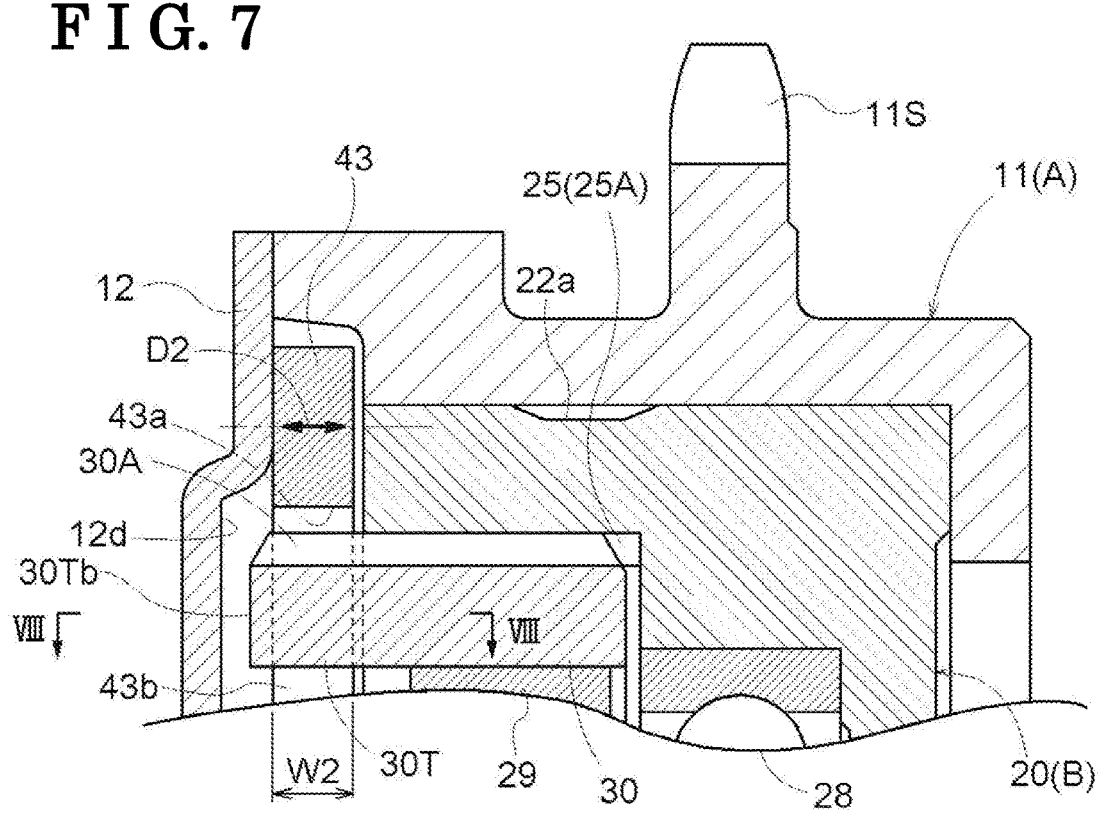
FIG. 7 is a cross-sectional view of a main part illustrating sliding operation of an internal engagement arm of the coupling member.
Figure 8:
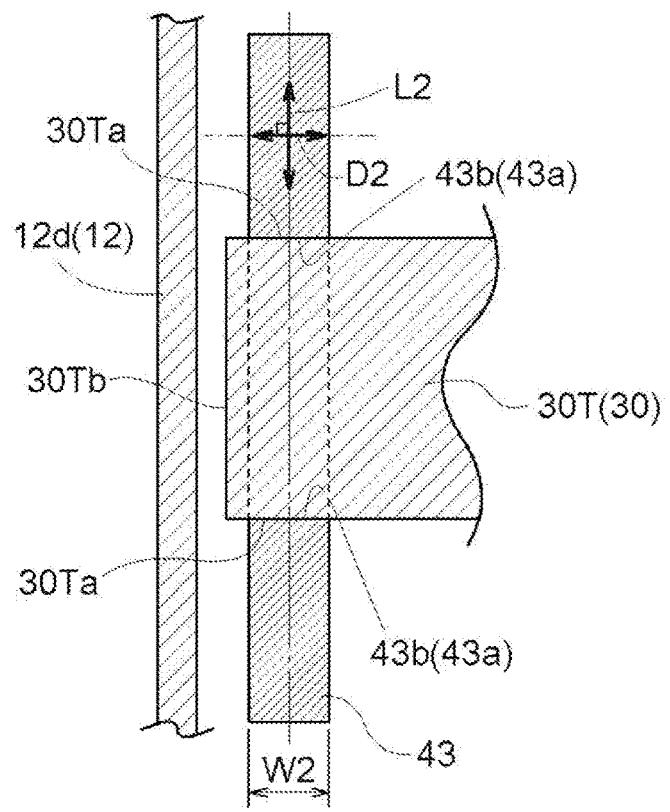
FIG. 8 is a cross-sectional view taken along the line VIII-VIII of FIG. 7.

As illustrated in FIGS. 7 and 8, each of the internal engagement arms 43 has both inner side surfaces 43b and 43b (an example of a pair of second arm flat surface portions) that are perpendicular to the rotational direction of the input gear 30. Each of the engagement protrusions 30T of the input gear 30 has both outer side surfaces 30Ta and 30Ta (an example of a pair of second engagement flat surface portions) that come into contact with the both inner side surfaces 43b and 43b of one of the internal engagement arms 43, respectively.

[Arrangement of Respective Components of Valve Opening-Closing Timing Control Apparatus]

In the valve opening-closing timing control apparatus 100 in an assembled state, the support wall portion 21 of the intermediate member 20 is connected to an end of the intake camshaft 2 by the connection bolt 23 as illustrated in FIG. 1, and the intermediate member 20 and the intake camshaft 2 integrally rotate. The eccentric member 26 is supported in a freely relatively rotatable manner about the rotation axis X with respect to the intermediate member 20 by the first bearing 28. As illustrated in FIGS. 1 and 2, the input gear 30 is supported onto the eccentric support surface 26E of the eccentric member 26 via the second bearing 29, and a portion of the outer tooth portion 30A of the input gear 30 meshes with a portion of the inner tooth portion 25A of the output gear 25.

Further, as illustrated in FIG. 4, the external engagement arms 42 of the Oldham coupling Cx engage with the pair of guide groove portions 11a of the outer case 11, and the engagement protrusions 30T of the input gear 30 engage with the engagement recessed portions 43a of the internal engagement arms 43 of the Oldham coupling Cx. Since, as illustrated in FIG. 1, the front plate 12 is arranged on the outer side of the coupling member 40 of the Oldham coupling Cx, the coupling member 40 becomes capable of moving in directions orthogonal to the rotation axis X while being in contact with the inner surface of the front plate 12. This arrangement causes the Oldham coupling Cx to be arranged on the outer side (the farther side from the intake camshaft 2) than both the first bearing 28 and the second bearing 29 and the inner side (the closer side to the intake camshaft 2) than the front plate 12.

As illustrated in FIGS. 1 to 3, the pair of engagement pins 8, which are formed on the output shaft Ma of the phase control motor M, engage with the engagement grooves 26T of the eccentric member 26.

[Operation Mode of Phase Adjustment Mechanism]

Although not illustrated in the drawings, the phase control motor M is controlled by a control device that is configured as an ECU. The engine E is provided with sensors that are capable of detecting rotational speeds (the number of rotations per unit time) and rotational phases of the crankshaft 1 and the intake camshaft 2 and is configured to input detection signals from the sensors to the control device.

The control device maintains a relative rotation phase by driving the phase control motor M at a speed equal to the rotational speed of the intake camshaft 2 when the engine E is running. On the other hand, decreasing the rotational speed of the phase control motor M to a lower speed than the rotational speed of the intake camshaft 2 causes an advance angle operation to be performed, and, conversely, increasing the rotational speed of the phase control motor M to a higher speed than the rotational speed of the intake camshaft 2 causes a retard angle operation to be performed. As described afore, the advance angle operation and the retard angle operation cause the intake compression ratio to be increased and reduced, respectively.

Since, when the phase control motor M rotates at the same speed as the outer case 11 (at the same speed as the intake camshaft 2), the meshing position of the inner tooth portion 25A of the output gear 25 and the outer tooth portion 30A of the input gear 30 does not change, the relative rotation phase of the driven-side rotor B with respect to the driving-side rotor A is maintained.

On the other hand, driving and rotating the output shaft Ma of the phase control motor M at a speed higher than or a speed lower than the rotational speed of the outer case 11 causes the eccentric axis Y to revolve about the rotation axis X in the phase adjustment mechanism C. The revolution causes the meshing position of the outer tooth portion 30A of the input gear 30 with respect to the inner tooth portion 25A of the output gear 25 to be displaced along the inner periphery of the output gear 25, and a rotational force is exerted between the input gear 30 and the output gear 25. In other words, a rotational force about the rotation axis X is exerted on the output gear 25, and a rotational force causing the input gear 30 to rotate about the eccentric axis Y is exerted on the input gear 30.

As described afore, the input gear 30 does not rotate with respect to the outer case 11 because the engagement protrusions 30T of the input gear 30 engage with the engagement recessed portions 43a of the internal engagement arms 43 of the coupling member 40, and the rotational force is exerted on the output gear 25. The exertion of the rotational force causes, in conjunction with the output gear 25, the intermediate member 20 to rotate about the rotation axis X with respect to the outer case 11. As a result, the relative rotation phase between the driving-side rotor A and the driven-side rotor B is set, and setting of opening and closing times by the intake camshaft 2 is thereby achieved.

When the eccentric axis Y of the input gear 30 revolves about the rotation axis X, the coupling member 40 of the Oldham coupling Cx is displaced in directions (the first directions) in which the relative positions of the external engagement arms 42 with respect to the outer case 11 change and the input gear 30 is displaced in directions (the second directions) in which the relative position of the input gear 30 with respect to the internal engagement arms 43 changes, associated with displacement of the input gear 30. The coupling member 40 is also displaced in directions (third directions) along the rotation axis X, associated with the displacement of the input gear 30 and the like.

As illustrated in FIG. 6, when the coupling member 40 is displaced in directions (the first directions) in which the relative positions of the external engagement arms 42 of the coupling member 40 with respect to the outer case 11 change, the both outer side surfaces 42a and 42a of each of the external engagement arms 42 slide with respect to the both inner side surfaces 11d and 11d of one of the guide groove portions 11a of the outer case 11, respectively. In FIG. 6, sliding directions D1 (the first directions) of the coupling member 40 are illustrated by a double-headed arrow, and directions L1 perpendicular to the sliding directions D1 are illustrated by another double-headed arrow. The directions L1 are directions in which the both outer side surfaces 42a and 42a and the both inner side surfaces 11d and 11d overlap each other, respectively. In this case, the both outer side surfaces 42a and 42a are, within a range in which the both outer side surfaces 42a and 42a slide with respect to the both inner side surfaces 11d and 11d that the both outer side surfaces 42a and 42a face, always in contact with overlapping portions W1 of the both inner side surfaces 11d and 11d with the both outer side surfaces 42a and 42a when the both outer side surfaces 42a and 42a and the both inner side surfaces 11d and 11d are viewed from the above-described directions L1, respectively.

This configuration causes the both outer side surfaces 42a and 42a of each of the external engagement arms 42 and the both inner side surfaces 11d and 11d of one of the guide groove portions 11a to continue in contact with each other at the overlapping portions W1, respectively, within the sliding range of the external engagement arm 42. As a result, it is possible to maintain a stable engagement state between the coupling member 40 and the outer case 11, which is connected to the coupling member 40, within the sliding ranges of the external engagement arms 42. Since there is no possibility that corner portions of one of the both outer side surfaces 42a and 42a of each of the external engagement arms 42 and the both inner side surfaces 11d and 11d of one of the guide groove portions 11a and surface portions of the other rub against each other in the sliding directions D1 of the external engagement arm 42, not only can friction loss at the time of sliding be reduced but also abrasion of the both outer side surfaces 42a and 42a and the both inner side surfaces 11d and 11d can be suppressed.

In this embodiment, each of the external engagement arms 42 further has a portion 42b that always protrudes in a radially outward direction beyond one of the guide groove portion 11a in a range in which the both outer side surfaces 42a and 42a of the external engagement arm 42 slide in a radial direction with respect to the outer case 11. This configuration enables not only the coupling member 40 and the outer case 11 to be surely engaged with each other but also a state in which the both outer side surfaces 42a and 42a of each of the external engagement arms 42 and the both inner side surfaces 11d and 11d of one of the guide groove portions 11a come into contact with each other at the overlapping portions W1, respectively, to be surely maintained even when the coupling member 40 is displaced in the first directions (radial directions).

As illustrated in FIGS. 7 and 8, when the internal engagement arms 43 of the coupling member 40 are displaced in directions (the third directions) along the rotation axis X with respect to the input gear 30, the both inner side surfaces 43b and 43b of each of the internal engagement arms 43 slide with respect to the both outer side surfaces 30Ta and 30Ta of one of the engagement protrusions 30T of the input gear 30, respectively. In this embodiment, the range in which the both inner side surfaces 43b and 43b of each of the internal engagement arms 43 slide in the third directions with respect to the both outer side surfaces 30Ta and 30Ta of one of the engagement protrusions 30T of the input gear 30, which the both inner side surfaces 43b and 43b face, respectively, is from the bottom surfaces of the guide groove portions 11a to the front plate 12. In FIGS. 7 and 8, sliding directions D2 (the third directions) of the coupling member 40 are illustrated by a double-headed arrow, and, in FIG. 8, directions L2 perpendicular to the sliding directions D2 are illustrated by another double-headed arrow. The directions L2 are directions in which the both inner side surfaces 43b and 43b and the both outer side surfaces 30Ta and 30Ta overlap each other, respectively. In this case, the both inner side surfaces 43b and 43b are, within a range in which the both inner side surfaces 43b and 43b slide with respect to the both outer side surfaces 30Ta and 30Ta, which the both inner side surfaces 43b and 43b face, always in contact with overlapping portions W2 of the both outer side surfaces 30Ta and 30Ta with the both inner side surfaces 43b and 43b when the both inner side surfaces 43b and 43b and the both outer side surfaces 30Ta and 30Ta are viewed from the above-described directions L2, respectively.

This configuration causes the both inner side surfaces 43b and 43b of each of the internal engagement arms 43 and the both outer side surfaces 30Ta and 30Ta of one of the engagement protrusions 30T of the input gear 30 to continue in contact with each other at the overlapping portions W2, respectively, within the sliding range of the internal engagement arm 43. As a result, it is possible to maintain a stable engagement state between the coupling member 40 and the input gear 30, which is connected to the coupling member 40. Since there is no possibility that corner portions of one of the both inner side surfaces 43b and 43b of each of the internal engagement arms 43 and the both outer side surfaces 30Ta and 30Ta of one of the engagement protrusions 30T and surface portions of the other rub against each other in the sliding directions D2 of the internal engagement arm 43, not only can friction loss at the time of sliding be reduced but also abrasion of engaging portions of the both inner side surfaces 43b and 43b and the outer side surfaces 30Ta and 30Ta can be suppressed.

In this embodiment, each of the engagement protrusions 30T of the input gear 30 further has a portion 30Tb that always protrudes in a direction along the rotation axis X beyond one of the internal engagement arms 43 of the coupling member 40 in a range in which the both inner side surfaces 43b and 43b of the internal engagement arm 43, which the engagement protrusion 30T faces, slide in the direction along the rotation axis X. This configuration enables not only the coupling member 40 and the input gear 30 to be surely engaged with each other but also a state in which the both inner side surfaces 43b and 43b of each of the internal engagement arms 43 and the both outer side surfaces 30Ta and 30Ta of one of the engagement protrusions 30T come into contact with each other at the overlapping portions W2, respectively, to be surely maintained even when the coupling member 40 is displaced in the third directions (directions along the rotation axis X).

Since, as described afore, the number of teeth of the outer tooth portion 30A of the input gear 30 is set at a number one tooth less than the number of teeth of the inner tooth portion 25A of the output gear 25, the output gear 25 is caused to rotate only by one tooth when the eccentric axis Y of the input gear 30 revolves only by one revolution about the rotation axis X, and a large gear reduction is thereby achieved.

As illustrated in FIGS. 4 and 5, a plurality of (two in this embodiment) engagement protrusions 30T are disposed on the input gear 30 at positions that face each other with the eccentric axis Y interposed therebetween among positions in radial directions with the eccentric axis Y as the center on the input gear 30. The coupling member 40 is configured in such a way as to be able to form a gap between the front plate 12 and the coupling member 40 in a direction along the rotation axis X and is capable of being displaced until coming into contact with the front plate 12. On the other hand, the both outer side surfaces 30Ta and 30Ta of one of the engagement protrusions 30T formed on the input gear 30 and the engagement recessed portion 43a of the one of the internal engagement arms 43 are required to be always in contact with each other within a range in which the coupling member 40 slides in the direction along the rotation axis X.

Thus, in this embodiment, recessed portions 12d (an example of a retreat portion) for avoiding contact with the engagement protrusions 30T are formed at parts of the front plate 12 that face the engagement protrusions 30T and the engagement protrusions 30T protrude to the inside of the recessed portions 12d, as illustrated in FIG. 8. This configuration, while enabling the engagement protrusions 30T to be prevented from coming into contact with of the front plate 12, enables the engagement protrusions 30T to be always in contact with the engagement recessed portions 43a. As a result, it is possible to cause the phase adjustment mechanism C to function properly.

[Lubrication of Phase Adjustment Mechanism]

As illustrated in FIG. 1, a lubricating oil passage 15 through which lubricating oil from an external oil pump P is supplied via an oil passage forming member 9 is formed in the intake camshaft 2. In a portion of a surface of the support wall portion 21 of the intermediate member 20 that comes into contact with the intake camshaft 2, an opening portion 21a that guides the oil into the inside of the eccentric member 26 is formed.

As described afore, a plurality of first lubricating oil grooves 26a and a plurality of second lubricating oil grooves 26b are formed on the eccentric member 26 (see FIGS. 1 and 5). On the surface of the front plate 12 facing the coupling member 40, lubricating recessed portions 12a that serve as slight gaps along radial directions between the surface of the front plate 12 and the front surface of the coupling member 40 are formed. Note that, although the lubricating recessed portions 12a are formed on the inner periphery side of the front plate 12, the lubricating recessed portions 12a may be formed in areas reaching the outer periphery of the front plate 12 or it may be configured to, without forming the lubricating recessed portions 12a, supply lubricating oil to a gap between the front plate 12 and the coupling member 40.

As described afore, the pairs of discharge flow passages 11b are formed on the bottom surfaces of the guide groove portions 11a of the outer case 11 (see FIGS. 4 and 5). Further, by setting the opening diameter of an opening 12b of the front plate 12 sufficiently larger than the inner diameter of the eccentric member 26, a level difference G is formed between the opening edge of the front plate 12 and the inner periphery of the eccentric member 26 (see FIG. 1).

This configuration causes lubricating oil supplied from the oil pump P to be supplied from the lubricating oil passage 15 in the intake camshaft 2 to the internal space of the eccentric member 26 via the opening portion 21a of the support wall portion 21 of the intermediate member 20. The lubricating oil supplied in this way is supplied from the first lubricating oil grooves 26a of the eccentric member 26 to the first bearing 28 by centrifugal force and causes the first bearing 28 to operate smoothly.

At the same time, the lubricating oil in the internal space of the eccentric member 26 is supplied from the second lubricating oil grooves 26b to the coupling member 40 by centrifugal force and is also supplied to the second bearing 29 and between the inner tooth portion 25A of the output gear 25 and the outer tooth portion 30A of the input gear 30.

As illustrated in FIG. 1, the lubricating oil from the second lubricating oil grooves 26b is supplied between the front plate 12 and the coupling member 40 through the lubricating recessed portion 12a and also supplied to gaps between the external engagement arms 42 of the coupling member 40 and the guide groove portions 11a of the outer case 11. This configuration causes the coupling member 40 to operate smoothly. The lubricating oil supplied to the coupling member 40 is discharged to the outside from the gaps between the external engagement arms 42 of the coupling member 40 and the guide groove portions 11a of the outer case 11.

In particular, since the level difference G is formed between the opening edge of the front plate 12 and the inner periphery of the eccentric member 26, it is possible to discharge the lubricating oil in the internal space of the eccentric member 26 from the opening 12b of the front plate 12 and thereby reduce the amount of lubricating oil remaining in the inside when the engine E is stopped. Note that, although, when a large amount of lubricating oil remains inside the valve opening-closing timing control apparatus 100, influence of viscosity of the lubricating oil causes the operation of the phase adjustment mechanism C after the engine E has been started in a cold environment to be restrained, discharging the lubricating oil when the engine E is stopped enables such an inconvenience to be eliminated.

Further, since the discharge flow passages 11b being formed on the guide groove portions 11a enables internal lubricating oil to be rapidly discharged via the discharge flow passages 11b by centrifugal force when, for example, the engine E that has been in the stopped state is started in a cold environment, it is possible to discharge highly viscous lubricating oil in a short period of time and eliminate influence of viscosity of the lubricating oil and thereby enable rapid operation of the phase adjustment mechanism C. It is also possible to discharge foreign objects present in the guide groove portions 11a from the discharge flow passages 11b, by using the lubricating oil and store the discharged foreign objects in the pocket portions 11c.

Figure 9:
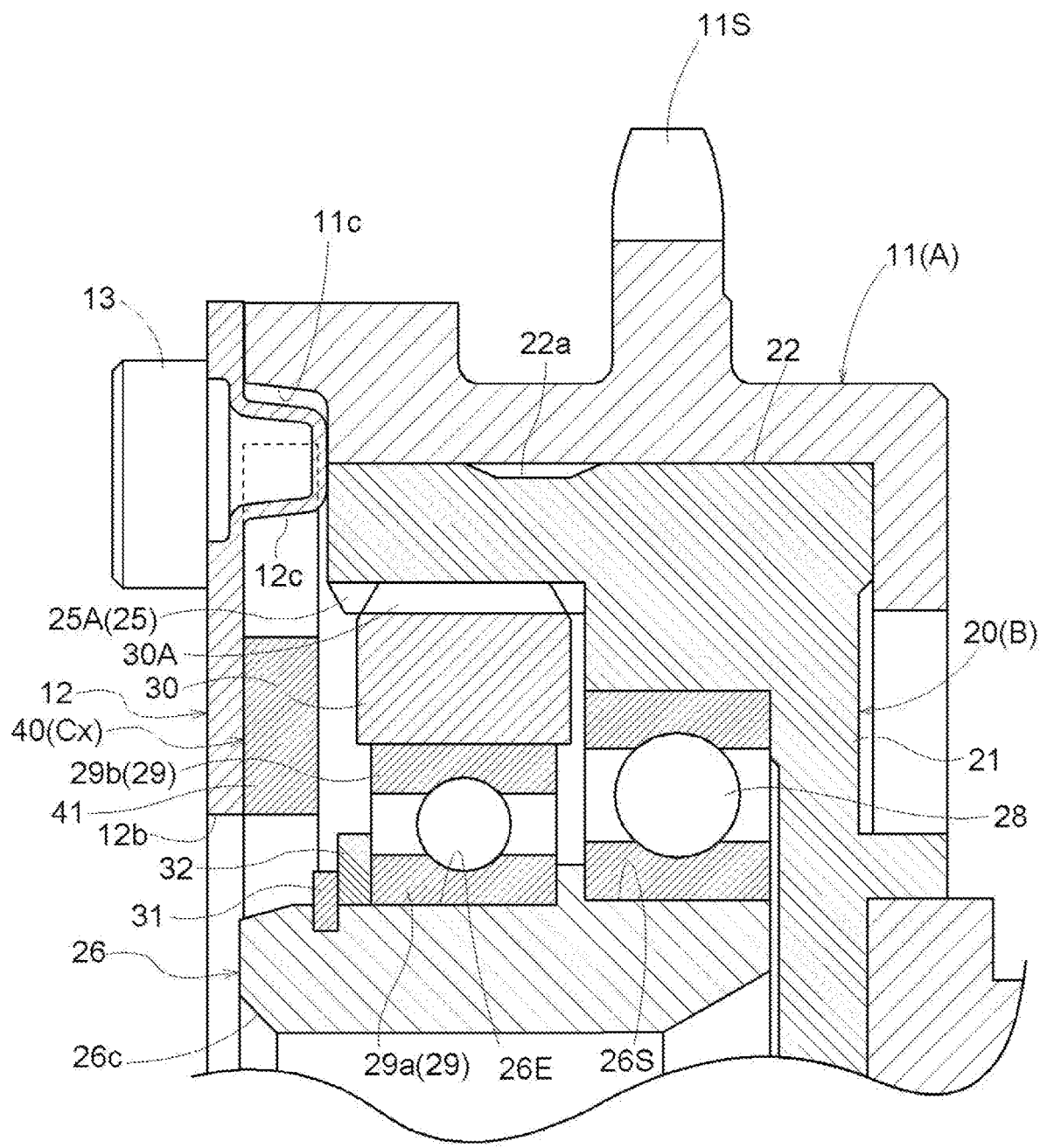
FIG. 9 is a cross-sectional view of a main part of the valve opening-closing timing control apparatus.

As illustrated in FIG. 9, projecting portions 12c that project toward the inner side are formed on the surface on the inner side (the side closer to the intake camshaft 2) of the front plate 12. The projecting portions 12c are arranged in such a way as to come into contact with the intermediate member 20. The intermediate member 20 is restricted from moving to the side where the front plate 12 is located by the projecting portions 12c. This configuration enables the coupling member 40 to rotate between the front plate 12 and the intermediate member 20 while maintaining predetermined gaps.

OTHER EMBODIMENTS (1) In the above-described embodiment, an example was described in which both a configuration (hereinafter, referred to as a configuration α) in which the both outer side surfaces 42a and 42a of each of the external engagement arms 42 of the coupling member 40 are always in contact with the both inner side surfaces 11d and 11d of one of the guide groove portions 11a of the outer case 11 at the overlapping portions W1, respectively, and a configuration (hereinafter, referred to as a configuration β) in which the both outer side surfaces 30Ta and 30Ta of each of the engagement protrusions 30T of the input gear 30 are always in contact with the both inner side surfaces 43b and 43b of one of the internal engagement arms 43 of the coupling member 40 at the overlapping portions W2, respectively, are provided.

In place of the above-described embodiment, a valve opening-closing timing control apparatus 100 including only either of the above-described configurations α and β may be employed.

(2) In the above-described embodiment, an example was described in which each of the external engagement arms 42 of the coupling member 40 has, on the tip side of the both outer side surfaces 42a and 42a of the external engagement arm 42, a portion 42b that always protrudes in a range in which the external engagement arm 42 slides with respect to one of the guide groove portions 11a. The external engagement arms 42 do not necessarily have to have the portions 42b that always protrude as long as the external engagement arms 42 are configured to be always in contact with the guide groove portions 11a at the overlapping portions W1.

(3) In the above-described embodiment, an example was described in which each of the engagement protrusions 30T of the input gear 30 has a portion 30Tb that always protrudes in a direction along the rotation axis X beyond one of the internal engagement arms 43 of the coupling member 40 in a range in which the both inner side surfaces 43b and 43b of the internal engagement arm 43 that the engagement protrusion 30T faces slide in the direction along the rotation axis X. The engagement protrusions 30T do not necessarily have to have the portions 30Tb that always protrude as long as the engagement protrusions 30T are configured to be always in contact with the internal engagement arms 43 at the overlapping portions W2.

Figure 10:
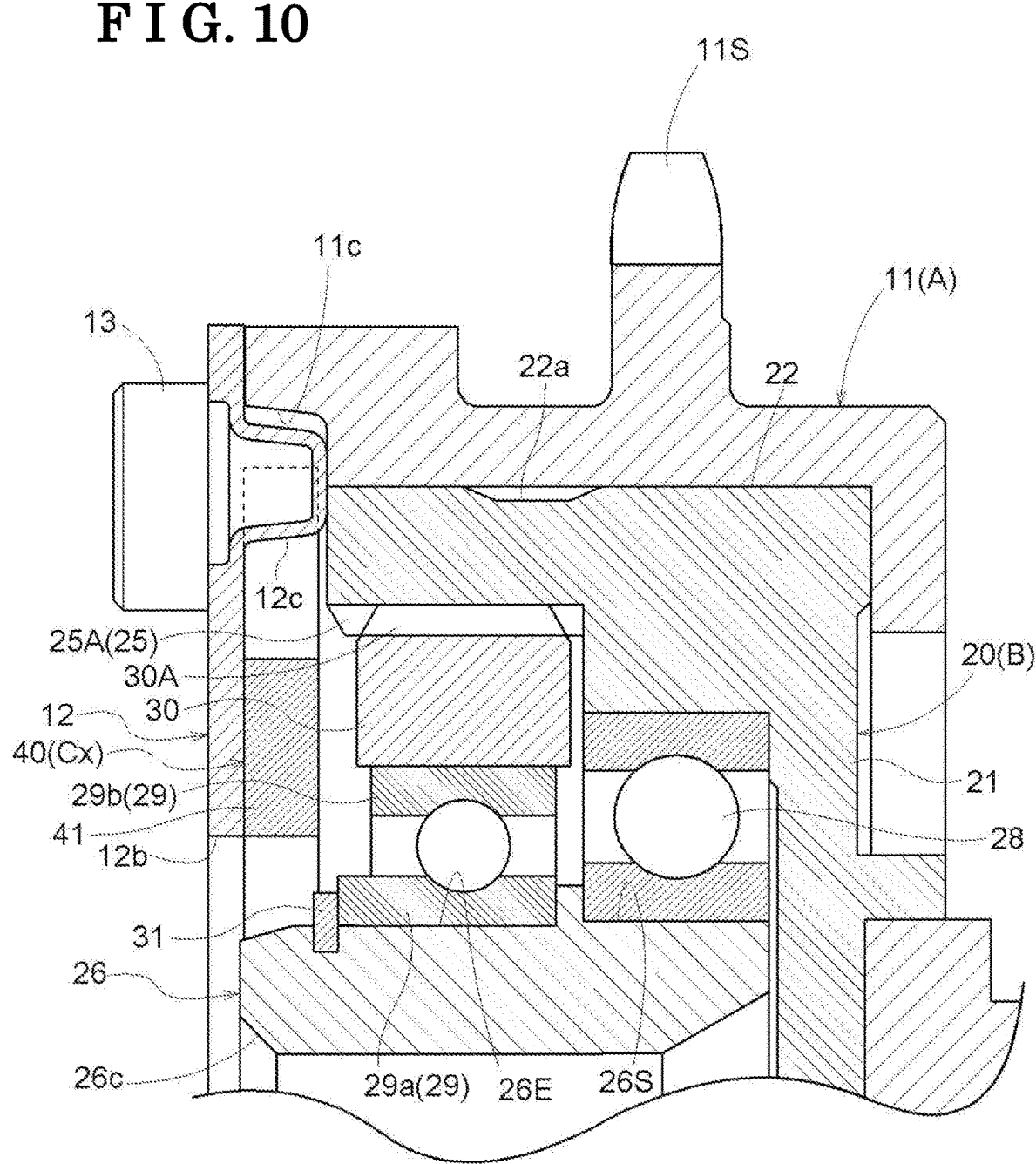
FIG. 10 is a cross-sectional view of a main part of a valve opening-closing timing control apparatus of another embodiment.

(4) In the above-described embodiment, the spacer 32 is arranged between the second bearing 29 and the coupling member 40. In place of using the spacer 32, an inner ring 29a of the second bearing 29 may be extended to the front plate side further than an outer ring 29b of the second bearing 29 in a direction along the rotation axis X as illustrated in FIG. 10. The extended inner ring 29a restricts the input gear 30 from moving to the front plate 12 side in the rotation axial direction. This configuration enables the engagement protrusions 30T to be prevented from coming into contact with the front plate 12.

This disclosure can be used for a valve opening-closing timing control apparatus that sets a relative rotation phase between a driving-side rotor and a driven-side rotor, by using drive force of an electric actuator.

A characteristic feature of this disclosure is that a driving-side rotor rotating about an rotation axis synchronously with a crankshaft of an internal-combustion engine, a driven-side rotor being arranged on an inner side of the driving-side rotor coaxially with the rotation axis and rotating integrally with a camshaft for valve opening and closing of the internal-combustion engine, and a phase adjustment mechanism setting a relative rotation phase between the driving-side rotor and the driven-side rotor, by using drive force of an electric actuator are included. The phase adjustment mechanism includes an output gear disposed on the driven-side rotor coaxially with the rotation axis, an input gear rotating about an eccentric axis having an orientation parallel with the rotation axis, having the number of teeth less than the output gear, being arranged coaxially with the eccentric axis, and being connected to the driving-side rotor via an Oldham coupling, and a cylindrically shaped eccentric member supporting, on an inner side of the input gear, the input gear in such a way as to cause the input gear to rotate about the eccentric axis, and is configured in such a way as to cause the eccentric axis to revolve by means of rotation of the eccentric member driven by drive force of the electric actuator and change a meshing position of the output gear and the input gear. The Oldham coupling includes an engagement arm projecting in a radially outward direction with the rotation axis as a center. At least either of the driving-side rotor and the input gear has an engagement portion with which the engagement arm is engaged, and is connected to the Oldham coupling. The engagement arm has a pair of arm flat surface portions perpendicular to a rotational direction of the driving-side rotor. The engagement portion has a pair of engagement flat surface portions that a pair of the arm flat surface portions face in a sliding contact manner. Each of the arm flat surface portions is configured in such a way as to be, within a range in which the arm flat surface portion slides with respect to one of the engagement flat surface portions that the arm flat surface portion faces, always in contact with an overlapping portion of the engagement flat surface portion with the arm flat surface portion when the arm flat surface portion and the engagement flat surface portion are viewed from a direction that is perpendicular to a sliding direction of the Oldham coupling and in which the arm flat surface portion and the engagement flat surface portion overlap each other.

The Oldham coupling is sometimes displaced in a radial direction with the rotation axis as the center or a direction along the rotation axis, with being influenced by displacement of the input gear, and, in such a case, the engagement arm slides with respect to the driving-side rotor or the input gear. According to this configuration, the arm flat surface portions on both side surfaces of the engagement arm of the Oldham coupling come into sliding contact with the engagement flat surface portions on both side surfaces of the engagement portion of at least either of the driving-side rotor and the input gear, and the arm flat surface portions are, within a range in which the arm flat surface portions slide with respect to the engagement flat surface portions that the arm flat surface portions face, always in contact with overlapping portions of the engagement flat surface portions with the arm flat surface portions when viewed from a predetermined direction. Therefore, the arm flat surface portion and the engagement flat surface portion are caused to continue in contact with each other at an overlapping portion between the arm flat surface portion and the engagement flat surface portion within the above-described sliding range. This configuration enables a stable engagement state to be maintained between the Oldham coupling and a member connected to the Oldham coupling within the above-described sliding range. Since a corner portion of one of the arm flat surface portion and the engagement flat surface portion and a surface portion of the other do not rub against each other in the sliding direction of the engagement arm, not only can friction loss at a time of sliding be reduced but also abrasion of both the arm flat surface portion and the engagement flat surface portion can be suppressed.

As another configuration, a pair of the arm flat surface portions may be both outer side surfaces of the engagement arm, the engagement portion may be a groove being formed in the driving-side rotor and penetrating in a radial direction, a pair of the engagement flat surface portions of the engagement portion may be both inner side surfaces of the groove, and each of the arm flat surface portions may have a portion that, in a range in which the arm flat surface portion slides in a radial direction with respect to one of the engagement flat surface portions that the arm flat surface portion faces, always protrudes in the radially outward direction beyond the engagement flat surface portion.

The Oldham coupling is sometimes displaced in a radial direction with the rotation axis as the center, with being influenced by displacement of the input gear, and, in such a case, the engagement arm slides with respect to the driving-side rotor. According to this configuration, the engagement arm of the Oldham coupling engages with the groove formed in the driving-side rotor, and the both outer side surfaces of the engagement arm serving as arm flat surface portions slide against the both inner side surfaces of the groove serving as engagement flat surface portions. In addition, the both outer side surfaces (arm flat surface portions) of the engagement arm of the Oldham coupling having a portion that always protrudes in a radially outward direction with respect to the both inner side surfaces (engagement flat surface portions) of the groove of the driving-side rotor that the both outer side surfaces face enables not only the Oldham coupling and the driving-side rotor to be surely engaged with each other but also a state in which the arm flat surface portion and the engagement flat surface portion come into contact with each other at the overlapping portion to be surely maintained even when the Oldham coupling is displaced in a radial direction.

As still another configuration, a pair of the arm flat surface portions may be both inner side surfaces of an engagement recessed portion formed in the engagement arm, the engagement portion may be a protrusion being formed on the input gear and projecting in a direction along the rotation axis, a pair of the engagement flat surface portions of the engagement portion may be both outer side surfaces of the protrusion, and each of the engagement flat surface portions may have a portion that, in a range in which one of the arm flat surface portions that the engagement flat surface portion faces slides in a direction along the rotation axis, always protrudes in a direction along the rotation axis beyond the arm flat surface portion.

The Oldham coupling is required to be smoothly displaced while sliding with respect to the input gear and the driving-side rotor and is mounted with gaps provided between the Oldham coupling, and the input gear and driving-side rotor, in the rotation axial direction. Thus, the Oldham coupling is sometimes displaced in a direction along the rotation axis, with being influenced by displacement of the input gear or the like, and, in such a case, the engagement recessed portion of the engagement arm slides with respect to the protrusion of the input gear. According to this configuration, the engagement recessed portion of the engagement arm of the Oldham coupling engages with the protrusion formed on the input gear, and the both inner side surfaces of the engagement arm serving as arm flat surface portions slide against the both outer side surfaces of the protrusion serving as engagement flat surface portions. In addition, the both outer side surfaces (engagement flat surface portions) of the protrusion of the input gear having a portion that always protrudes in a direction along the rotation axis with respect to the both inner side surfaces (arm flat surface portions) of the engagement recessed portion of the engagement arm that the both outer side surfaces face enables not only the Oldham coupling and the input gear to be surely engaged with each other but also a state in which the arm flat surface portion and the engagement flat surface portion come into contact with each other at the overlapping portion to be surely maintained even when the Oldham coupling is displaced in a direction along the rotation axis.

As still another configuration, a front plate fixed to the driving-side rotor on a far side from the camshaft with respect to the Oldham coupling in a direction along the rotation axis may be included, a plurality of the engagement portions may be disposed on the input gear at positions that face each other with the eccentric axis interposed therebetween among positions in radial directions with the eccentric axis as a center, and the front plate may have a retreat portion formed at a part facing each of the engagement portions, the retreat portion avoiding the front plate coming into contact with the engagement portion.

The Oldham coupling is configured in such a way as to be able to form a gap between the front plate and the Oldham coupling in the rotation axial direction and is capable of being displaced until coming into contact with the front plate. On the other hand, the both outer side surfaces of the protrusion formed on the input gear and the both inner side surfaces of the engagement recessed portion of the Oldham coupling are required to be always in contact with each other within a range in which the Oldham coupling slides in a direction along the rotation axis. Thus, in this configuration, the retreat portion is formed on the front plate, and the engagement portion (protrusion) of the input gear projects to an inside of the retreat portion. This configuration, while enabling the protrusion to be prevented from coming into contact with the front plate, enables the protrusion to be always in contact with the engagement recessed portion. As a result, it is possible to cause the phase adjustment mechanism to function properly.

As still another configuration, the engagement arm may include a first engagement arm and a second engagement arm orthogonal to a projecting direction of the first engagement arm, the engagement portion may include a first engagement portion formed in the driving-side rotor and engaged with the first engagement arm and a second engagement portion formed on the input gear and engaged with the second engagement arm, a pair of first arm flat surface portions that are a pair of arm flat surface portions of the first engagement arm may be both outer side surfaces of the first engagement arm, the first engagement portion may be a groove being formed in the driving-side rotor and penetrating in a radial direction, a pair of first engagement flat surface portions that are a pair of the engagement flat surface portions of the first engagement portion may be both inner side surfaces of the groove, a pair of second arm flat surface portions that are a pair of the arm flat surface portions of the second engagement arm may be both inner side surfaces of an engagement recessed portion formed in the second engagement arm, the second engagement portion may be a protrusion being formed on the input gear and projecting in a direction along the rotation axis, a pair of second engagement flat surface portions that are a pair of the engagement flat surface portions of the second engagement portion may be both outer side surfaces of the protrusion, each of the first arm flat surface portions may have a portion that, in a range in which the first arm flat surface portion slides in a radial direction with respect to one of the first engagement flat surface portions that the arm flat surface portion faces, always protrudes in the radially outward direction beyond the first engagement flat surface portion, and each of the second engagement flat surface portions may have a portion that, in a range in which one of the second arm flat surface portions that the second engagement flat surface portion faces slides in a direction along the rotation axis, always protrudes in a direction along the rotation axis beyond the second arm flat surface portion.

According to this configuration, the first engagement arm of the Oldham coupling engages with the groove formed in the driving-side rotor, and the both outer side surfaces of the first engagement arm serving as the first arm flat surface portions slide against the both inner side surfaces of the groove serving as the first engagement flat surface portions. In addition, the engagement recessed portion of the second engagement arm of the Oldham coupling engages with the protrusion formed on the input gear, and the both inner side surfaces of the second engagement arm serving as the second arm flat surface portions slide against the both outer side surfaces of the protrusion serving as the second engagement flat surface portions. This configuration enables the Oldham coupling, and the driving-side rotor and input gear to be surely engaged with each other.

In addition to the above, the both outer side surfaces (first arm flat surface portions) of the first engagement arm of the Oldham coupling having a portion that always protrudes in a radially outward direction with respect to the both inner side surfaces (first engagement flat surface portions) of the groove of the driving-side rotor that the both outer side surfaces face enable a state in which the first arm flat surface portions are always in contact with the overlapping portions with the first engagement flat surface portions to be surely achieved even when the Oldham coupling is displaced in a radial direction. In addition, the both outer side surfaces (second engagement flat surface portions) of the protrusion of the input gear having a portion that always protrudes in a direction along the rotation axis with respect to the both inner side surfaces (second arm flat surface portions) of the engagement recessed portion of the second engagement arm that the both outer side surfaces face enable a state in which the arm flat surface portions are always in contact with the engagement flat surface portions at the overlapping portions therebetween to be surely achieved even when the Oldham coupling is displaced in a direction along the rotation axis. As described above, the Oldham coupling is able to maintain an engagement state through surface contact between the Oldham coupling, and the driving-side rotor and input gear.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve opening-closing timing control apparatus comprising:
   a driving-side rotor that rotates about a rotation axis synchronously with a crankshaft of an internal-combustion engine;
   a driven-side rotor that is arranged on an inner side of the driving-side rotor coaxially with the rotation axis and rotates integrally with a camshaft for valve opening and closing of the internal-combustion engine; and
   a phase adjustment mechanism that sets a relative rotation phase between the driving-side rotor and the driven-side rotor, by using drive force of an electric actuator, wherein
   the phase adjustment mechanism includes an output gear disposed on the driven-side rotor coaxially with the rotation axis, an input gear rotating about an eccentric axis in an orientation parallel with the rotation axis, having a number of teeth less than the output gear, being arranged coaxially with the eccentric axis, and being connected to the driving-side rotor via an Oldham coupling, and a cylindrically shaped eccentric member supporting, on an inner side of the input gear, the input gear in such a way as to cause the input gear to rotate about the eccentric axis, and is configured in such a way as to cause the eccentric axis to revolve by means of rotation of the eccentric member driven by drive force of the electric actuator and change a meshing position of the output gear and the input gear,
   the Oldham coupling has an engagement arm projecting in a radially outward direction with the rotation axis as a center,
   at least either of the driving-side rotor and the input gear has an engagement portion with which the engagement arm is engaged, and is connected to the Oldham coupling,
   the engagement arm has a pair of arm flat surface portions perpendicular to a rotational direction of the driving-side rotor,
   the engagement portion has a pair of engagement flat surface portions that the pair of arm flat surface portions face in a sliding contact manner,
   each of the arm flat surface portions is configured in such a way as to be, within a range in which one of the pair of arm flat surface portions slides with respect to one of the pair of engagement flat surface portions that the arm flat surface portion faces, always in contact with an entirety of an overlapping portion of the engagement flat surface portion with the arm flat surface portion when the arm flat surface portion and the engagement flat surface portion are viewed from a direction that is perpendicular to a sliding direction of the Oldham coupling and in which the arm flat surface portion and the engagement flat surface portion overlap each other, the pair of arm flat surface portions are both outer side surfaces of the engagement arm, the engagement portion is a groove being formed in the driving-side rotor and penetrating in a radial direction, the pair of engagement flat surface portions of the engagement portion are both inner side surfaces of the groove, and each of the arm flat surface portions has a portion that, in a range in which the arm flat surface portion slides in a radial direction with respect to one of the pair of engagement flat surface portions that the arm flat surface portion faces, always protrudes in the radially outward direction beyond the engagement flat surface portion.

2. The valve opening-closing timing control apparatus according to claim 1, further comprising a second engagement arm orthogonal to a projecting direction of the engagement arm, a second engagement portion engaged with the second engagement arm, the second engagement portion being a protrusion formed on the input gear and projecting in a direction along the rotation axis, a pair of second arm flat surface portions of the second engagement arm that are both inner side surfaces of an engagement recessed portion formed in the second engagement arm, a pair of second engagement flat surface portions of the second engagement portion that are both outer side surfaces of the protrusion, wherein each of the second engagement flat surface portions has a portion that, in a range in which one of the second arm flat surface portions that one of the pair of second engagement flat surface portions faces slides in a direction along the rotation axis, always protrudes in a direction along the rotation axis beyond the second arm flat surface portion.

3. The valve opening-closing timing control apparatus according to claim 2, further comprising a front plate fixed to the driving-side rotor on a far side from the camshaft with respect to the Oldham coupling in a direction along the rotation axis, wherein a plurality of the second engagement portions are disposed on the input gear at positions that face each other with the eccentric axis interposed between the positions among positions in radial directions with the eccentric axis as a center, and the front plate has a retreat portion formed at a part facing each of the second engagement portions, the retreat portion avoiding the front plate coming into contact with the second engagement portions.

* * * * *